United States Patent [19]

Suzuki

[11] Patent Number: 4,472,782

[45] Date of Patent: Sep. 18, 1984

[54] METHOD OF OPERATING AN NC MACHINE TOOL IN ACCORDANCE WITH WORKPIECE AND TOOL PROFILE DATA

[75] Inventor: Toshiharu Suzuki, Yokohama, Japan

[73] Assignee: Nissan Motor Company, Limited, Yokohama, Japan

[21] Appl. No.: 342,250

[22] Filed: Jan. 25, 1982

[30] Foreign Application Priority Data

Jan. 26, 1981 [JP] Japan .................................. 56-8951

[51] Int. Cl.³ ............................................. G06F 15/46
[52] U.S. Cl. .................................. 364/474; 364/167; 364/168; 318/578; 33/174 PC; 33/174 P
[58] Field of Search ............... 364/474, 475, 167, 168, 364/169, 170, 513, 514, 560; 33/174 PC, 174 P; 318/578

[56] References Cited

U.S. PATENT DOCUMENTS

| | | | |
|---|---|---|---|
| 3,927,948 | 12/1975 | Cox et al. ............................ | 364/560 |
| 4,068,154 | 1/1978 | Cecil et al. .......................... | 318/578 |
| 4,157,679 | 6/1979 | Wenzel ................................ | 318/578 |
| 4,176,396 | 11/1979 | Howatt ................................ | 364/474 |
| 4,224,670 | 9/1980 | Yamayaki ........................... | 364/474 |
| 4,258,425 | 3/1981 | Ramsey et al. ..................... | 364/513 |
| 4,350,065 | 9/1982 | Hayashi et al. ..................... | 364/475 |
| 4,355,362 | 10/1982 | Imazeki et al. ..................... | 364/474 |
| 4,370,722 | 1/1983 | Imazeki et al. ..................... | 318/578 |
| 4,386,408 | 5/1983 | Imazeki et al. ..................... | 364/168 |

Primary Examiner—Joseph F. Ruggiero
Assistant Examiner—John R. Lastova
Attorney, Agent, or Firm—Schwartz, Jeffery, Schwaab, Mack, Blumenthal & Koch

[57] ABSTRACT

Method of feeding positional data from a virtual model of a profiled physical model into a movement position device which controls movement of a tool according to the positional data fed thereinto. The method comprises the following steps: defining a virtual stylus whose profile depends on the distribution of "1's" and "0's" in bit positions in a memory space, said positions corresponding to positions in real space with respect to each three-dimensional coordinate axis; storing three-dimensional data on a virtual image of the profiled model, the profile of the former depending on the distribution of "1's" and "0's" in each bit positions in a memory space, said positions corresponding to a positions in real space, the positions in the memory space and real space being referred to the related three-dimensional coordinate systems, and moving the virtual stylus within either a "0" bit area or "1" bit area of the profiled model so as to scan the boundary surface between the distributions of "1's" and "0's", whereby the positional data for forming a male work or female work can be obtained and fed into the position control device.

7 Claims, 8 Drawing Figures

METHOD OF OPERATING AN NC MACHINE TOOL IN ACCORDANCE WITH WORKPIECE AND TOOL PROFILE DATA

BACKGROUND OF THE INVENTION (1) Field of the Invention

The present invention relates to a method of operating a numerical control (NC) machine tool in accordance with workpiece and tool profiling data in order to fabricate a product.

(2) Description of the Prior Art

In numerical control (NC) machine tools, data for the desired positions of the tool is fed from an NC tape into the NC machine to control tool movement and position.

However, disadvantages arise when, for example, a metal mold having a three dimensional profile is fabricated using such an NC machine tool. Then preparation of the NC tape is difficult, especially if the three-dimensional profile of the metal mold includes curved surfaces which cannot be expressed mathematically, and the NC tape can become very lengthy as the curved surfaces become more complicated.

On the other hand, a profiling lathe may be used wherein a stylus travels along the surface of a previously prepared physical model, and a tool is moved along the surface of the workpiece in a manner coordinated with the motion of the stylus by means of a feed mechanism, so that the surface profile of the finished workpiece will conform completely to that of the model. Therefore, if the profiled model has a complicated three-dimensional profile, such a profile lathe can complete the precise profiling of the work relatively easily. However, it takes a considerably long time to prepare a highly precise model for profiling, and the wear of the stylus results in deterioration of precision of the profiled model due to the repeated use of the same profiled model and stylus.

In this way, there have been problems in these two methods of providing positional data in these two kinds of machine tools.

SUMMARY OF THE INVENTION

It is an object present of the invention to provide a method of precisely fabricating a product from a workpiece using a machine tool such as described above, or another automatic position control device, e.g., a robot.

The present invention involves storing data on the configuration of the surface of the final product in a form which can be conceptualized as a distribution of logical "1's" through a "volume" of the three-dimensional memory array, the distribution being called the virtual model, points in the unoccupied volume of the memory array being assigned the value "0". In this way, there is a direct correspondence between the coordinates of a point on the surface of the article being fabricated and a "point" on the "surface" of the virtual model. The points on the surface of the virtual model can thus be conceptualized as having "coordinates". Determining the location of surface points within the array may be conceived of as using a "virtual stylus". Relatively simple control of the machine tool is effected by coordinating the movement of the virtual stylus with the tool used in fabricating the desired article.

According to the present invention, the method comprises the following steps of:

(a) storing a binary representation of the three-dimensional contour of the surface of the desired product in memory locations of a storage device provided within the machine;

(b) storing a binary representation of the outer surface of the tool in additional memory locations of the storage device;

(c) storing a binary representation of the inner surface of the tool, wholly within and essentially conforming to the outer surface of the tool, in the storage device (all of the foregoing binary representations being referenced to similar coordinate systems);

(d) changing the coordinates of the binary representations of the outer and inner surfaces in a predetermined fashion to simulate step-wise movement of the tool toward the surface of the product along one axis of the coordinate system;

(e) changing the coordinates of the binary representations of the outer and inner surface along the other axis or axes of the coordinate system when the coordinates of at least one point of the binary representation of the outer surface coincide with those of a point of the binary representation of the product surface;

(f) changing the coordinates of the binary representations of the outer and inner surfaces in a predetermined fashion so as to simulate movement of the tool away from the product surface when the coordinates of at least one point of the binary representation of the inner surface coincide with those of a point of the binary representation of the product surface; and (g) moving the tool relative to the workpiece in accordance with the changes in the binary representations.

BRIEF DESCRIPTION OF THE DRAWINGS

The features and advantages of the present invention will be better appreciated from the following description taken in conjunction with the accompanying drawings in which like reference numerals designate corresponding elements, and in which.

DETAILED DESCRIPTION OF PREFERRED EMBODIMENTS

Figure 1:
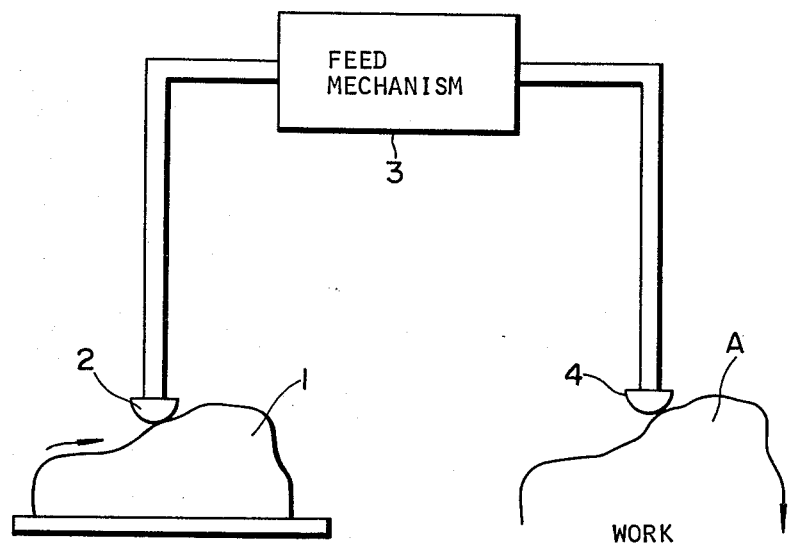
FIG. 1 is a plane, partially diagrammatic view of a conventional profile lathe.

With reference to FIG. 1, numeral 1 denotes a previously prepared model. Numeral 2 denotes a stylus having a hemispherical body at its end. As stylus 2 travels along the surface of model 1, a feed mechanism 3 moves a tool 4 (such as a ball end cutter) along the surface of workpiece A in a fashion related to the surface of model 1 so as to fabricate from workpiece A a product the surface of which is geometrically congruent or similar to the surface of model 1. A profiling lathe such as shown in FIG. 1 can be used to fabricate relatively easily a product based upon a complicated three-dimensional metal model. However, such a conventional profiling lathe has drawbacks in that preparing a highly precise model to be profiled consumes considerable time. Fabricating from a workpiece A a product identical to such a precise model also takes considerable time, since complex models result in many intersecting cutter paths. Repeated use of a physical model of such high precision also results in deterioration of reproduction precision due to frictional wear of the stylus and the model.

Figure 2:
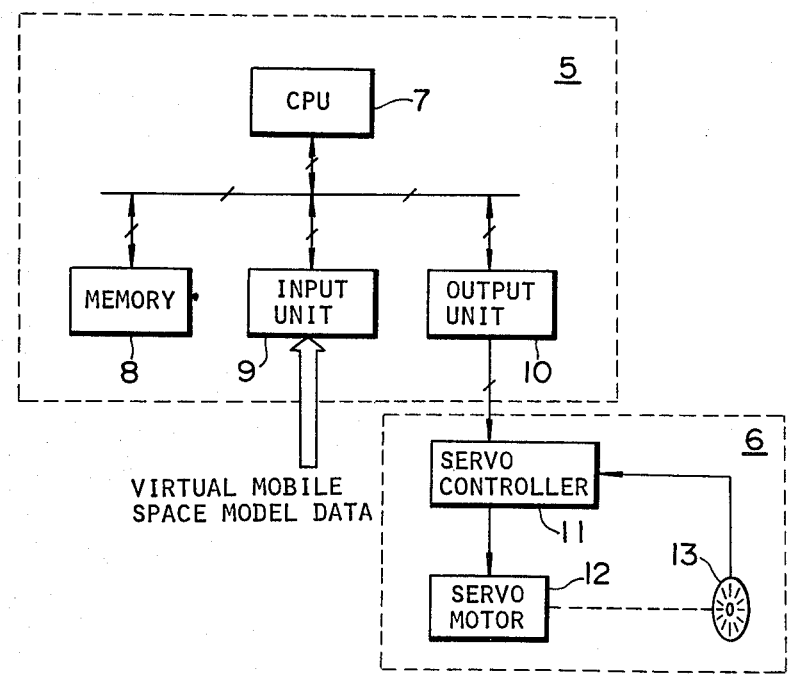
FIG. 2 is a block diagram of an NC controller in a machine tool such as to which the present invention might be applied.

As shown in FIG. 2 an NC controller comprises: (a) a microcomputer section 5 which performs various control operations according to the present invention; and (b) a control device section 6 which controls movement and positioning of a tool (cutter) of the NC machine tool main body (not shown) according to the positional data or profiling data supplied by microcomputer section 5.

The microcomputer section 5 comprises a CPU 7 (Central Processing Unit), memory unit 8 (having at least one RAM and preprogrammed ROM), input unit 9 (having an interface circuit), and output unit 10 (having a digital to analog converter and an interface circuit). CPU 7 performs various operations for handling data representing a bit-constructed virtual model in accordance with an execution sequence to be described hereinafter to obtain the positional data needed to fabricate a product. The positional data thus obtained is outputted by means of generating coordinate position signals to the positioning device section 6 via the output circuit 10. The positioning section 6 (servomechanism), comprising a servocontroller 11, DC servomotor 12, and rotary encoder 13, performs feedback control over the position to which the tool (not shown) moves on the basis of signals indicating the positional data for the tool fed from the microcomputer section 5. Such a virtual mobile space model as shown in FIG. 3 (hereinafter referred simply as to "virtual model") is previously constructed within the memory of another large-sized computer.

Figure 3:
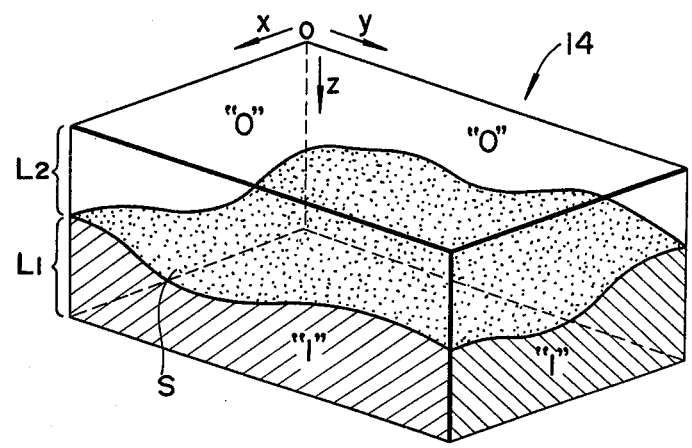
FIG. 3 shows an example of a virtual model and free space virtually constructed in a three-dimensional memory array of memory locations.

As shown in FIG. 3, the virtual model is virtually constructed within a three-dimensional memory array 14 by denoting with bits set equal to "1" a model region corresponding to the body 1 of the physical metal mold as shown in FIG. 1 and denoting with bits set equal to "0" the unoccupied space corresponding to the space where the stylus 2 as shown in FIG. 1 can move freely. A three-dimensional rectangular coordinate system (x,y,z) with orgin O ($x_0$, $y_0$, $z_0$) within the memory array 14 thus has an exact correspondence with the three-dimensional space through which a tool such as a cutter in the NC machine tool moves. To virtual model data thus stored in the other large-sized computer is transferred into the internal memory unit 8 of the microcomputer section 5. All virtual model data is then either transferred all at the same time if the amount of RAM in memory unit 8 is large enough to retain all of the model data simultaneously or is transferred in separate blocks as needed if the amount of RAM is not so large.

When the virtual model data defined by "1" and "0" bits is transferred into RAM of the memory unit 8 through input unit 9, the respective depths $L_1$ and $L_2$ in the Z-direction as shown in FIG. 3 may be determined depending on the amount of RAM in memory unit 8 in order to substantially reduce the number of bits to be stored in the memory unit. It will be noted that the virtual model data in the RAM is so constructed that either a "1" or "0" bit is read when accessing an address specified by a three-dimensional rectangular coordinates in the form ($x_i$, $y_j$, $z_k$).

What ensues is a description of the procedure for producing a finished product from a blank workpiece utilizing a numerically controlled machine programmed according to the present invention to controllably move a tool and the workpiece relative to one another to produce a finished product having a desired configuration, with reference to FIGS. 4(A), 4(B), 5(A), 5(B), and 5(C).

Figure 4A:
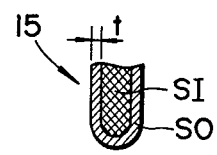
FIG. 4(A) shows an example of a virtual stylus provided for explaining the operation of a virtual stylus according to the present invention.
Figure 4A:
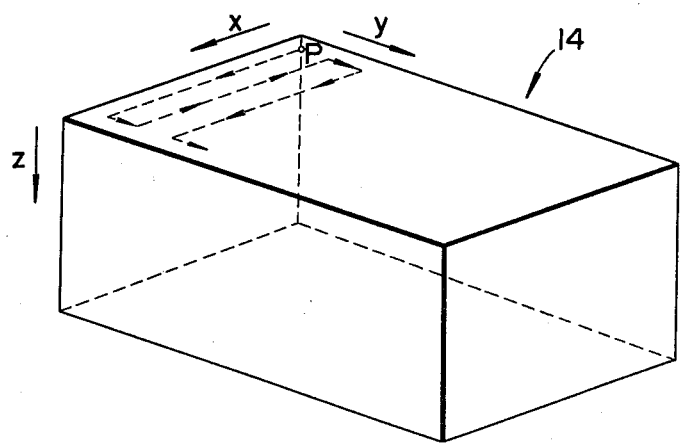
Figure 4B:
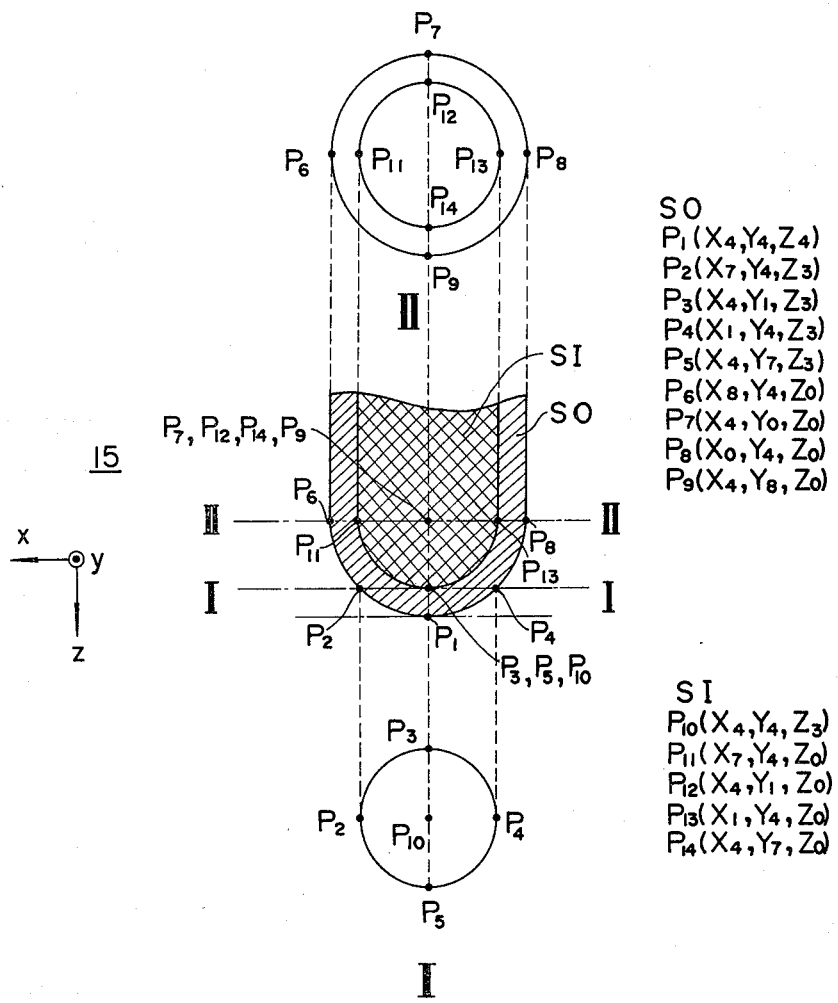
FIG. 4(B) shows an example of the three-dimensional virtual stylus segmented horizontally for representing the coordinates of the exterior and interior surfaces of the virtual stylus according to the present invention.

First, defining a virtual stylus 15 corresponding to a real stylus is described below with reference to FIGS. 4(A) and 4(B). The virtual stylus 15 scans vertically and horizontally along a locus in a zig-zag fashion on the interface S between the area of the array loaded with bits "1" and that loaded with bits "0" stored within the specified memory area of the RAM and corresponding to the surface shown in FIG. 3. The size and profile of virtual stylus 15 corresponds to the actual physical tool being used with the conventional NC machine, and the three-dimensional coordinate data selectively accessed at the surface of the virtual stylus 15 is stored within the RAM of the memory unit 8. The virtual stylus 15 is divided into two portions: exterior contour SO, and interior contour SI enclosed within exterior contour SO as shown in FIGS. 4(A) and 4(B) for increasing the accuracy of detection of the interface S. This is particularly advantageous for moving virtual stylus 15 upward along interface S during horizontal scanning to be described hereinbelow. The virtual stylus 15 is predefined in the RAM of the memory unit 8 so that the correspondence between the number of bits to the equivalent physical unit size of the virtual stylus 15 is the same as the correspondence of the number of bits representing points of the three dimensional array of the virtual model to the equivalent physical unit size of the actual workpiece. For example, the least significant bit along any X, Y, or Z axis may correspond to 1 mm. A thickness t of the exterior contour SO shown in FIG. 4(A) is assumed to correspond to at least one bit wherein one bit corresponds to a preselected minimal movement of the stylus along any given axis, e.g., 1 mm along the z axis. In FIGS. 4(A) and 4(B), the virtual stylus 15 is enlarged out of scale with the size of memory array 14 for the virtual model for convenience of explanation.

Figure 5A:
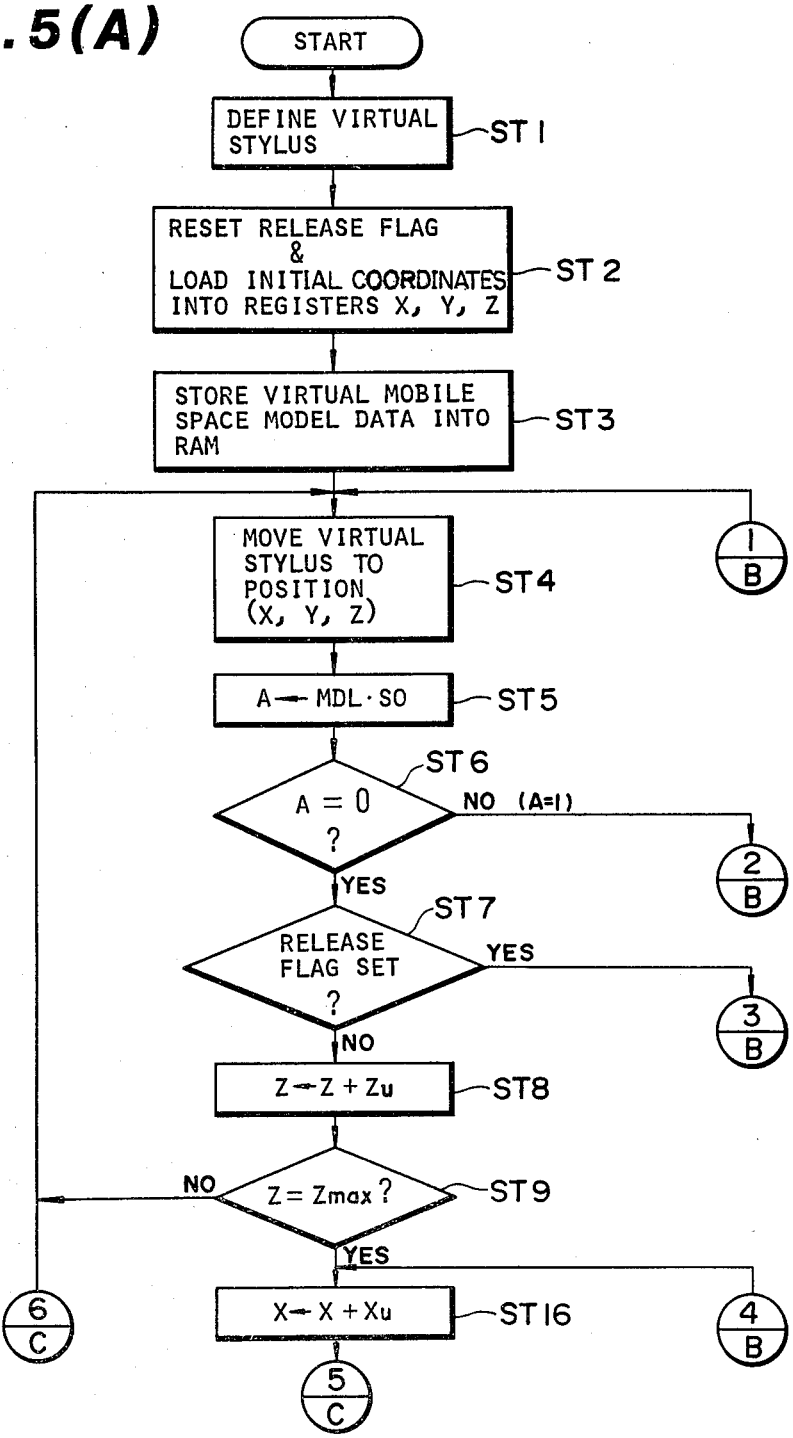
FIGS. 5(A), 5(B), and 5(C) together comprise a flow-chart of the execution sequence for producing product data for an NC machine tool using the data representing virtual model and virtual stylus positions.
Figure 5B:
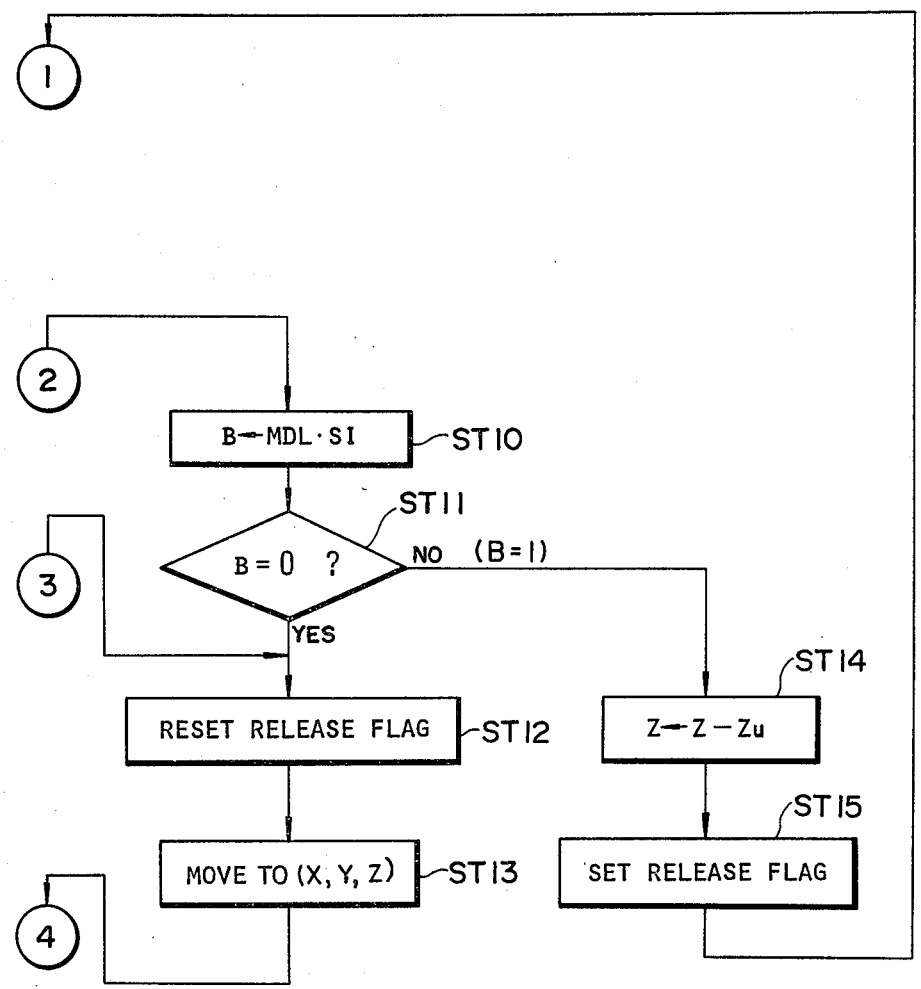
Figure 5C:
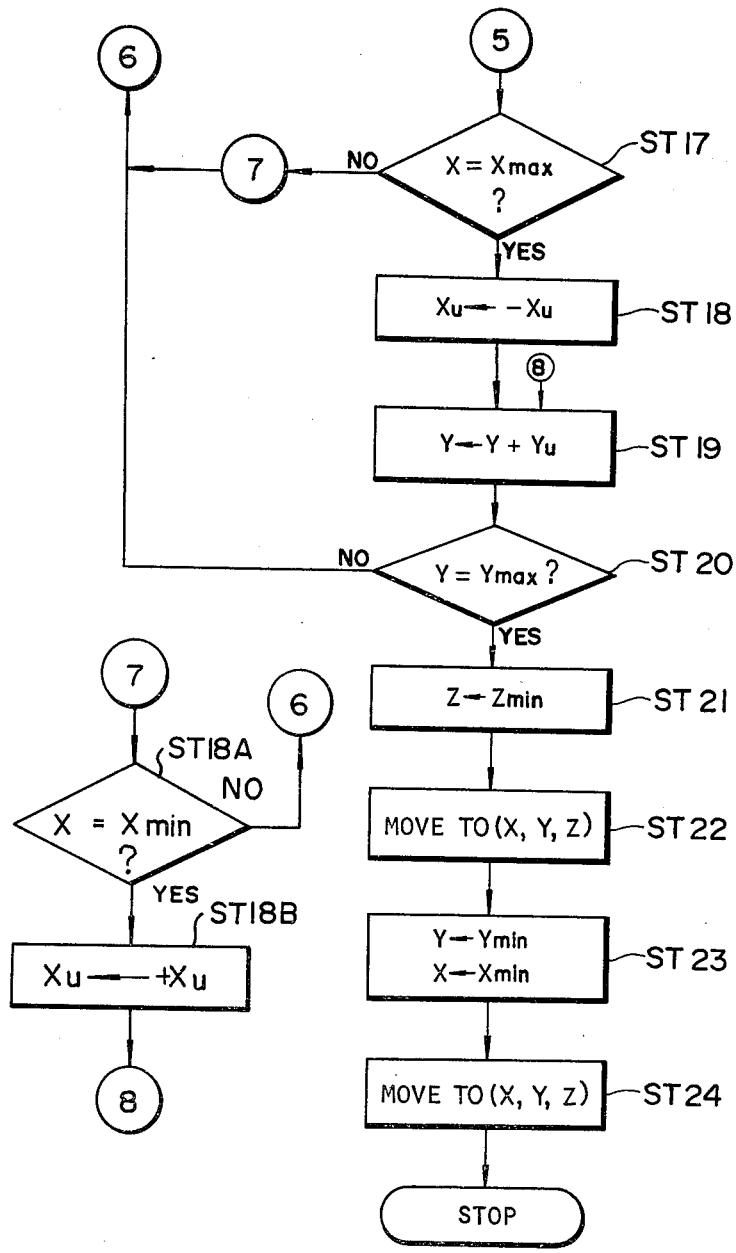

With reference to FIGS. 5(A) through 5(C), the scanning procedure of the virtual stylus 15 along the interface S will be described hereinafter. It will be noted that FIGS. 5(A) through 5(C) together comprise a flowchart applicable to cases where the storage capacity of the RAM in the memory unit 8 is large enough to hold all of the data of the virtual model at one time.

First in step 1, ST1, the CPU 7 reads intput data on the predefined virtual stylus 15, corresponding to a physical tool attached to the NC machine, with the bit values of the surfaces SO and SI set at "1". This data is then stored in the memory area of the RAM in the memory unit 8. In more detail, the virtual stylus 15 is segmented into, e.g., three parts as shown in FIG. 4(B) for defining its size and profile. For example, the stylus defining points of FIG. 4(B) are all illustrated to be within or at the surface of the model volume region defined by memory array 14. The tip coordinates $P_1$ of the virtual stylus 15 are stored in the head address in the form of, e.g., $P_1$ ($x_4$, $y_4$, $z_4$). The coordinates of the other exterior contour points SO of the virtual stylus 15 virtually segmented along a line I—I are stored in the next addresses in similar forms, e.g., $P_2$ ($x_7$, $y_4$, $z_3$), $P_3$ ($x_4$, $y_1$, $z_3$), $P_4$ ($x_1$, $y_4$, $z_3$), and $P_5$ ($x_4$, $y_7$, $z_3$). The coordinates of the remaining exterior contour points SO of the virtual stylus 15 virtually segmented along a line II—II are stored in the subsequent addresses in the form of, e.g., $P_6$ ($x_8$, $y_4$, $z_0$), $P_7$ ($x_4$, $y_0$, $z_0$), $P_8$ ($x_0$, $y_4$, $z_0$) and $P_9$ ($x_4$, $y_8$, $z_0$). The coordinates of the interior contour points SI of the virtual stylus 15 virtually segmented along the two lines I—I and II—II are stored in the subsequent addresses in the form of, e.g., $P_{10}$ ($x_4$, $y_4$, $z_3$), $P_{11}$ ($x_7$, $y_4$, $z_0$), $P_{12}$ ($x_4$, $y_1$, $z_0$), $P_{13}$ ($x_1$, $y_4$, $z_0$), and $P_{14}$ ($x_4$, $y_7$, $z_0$).

In the step 2, ST2, the coordinates of the initial scan position P of the memory array is read and loaded into registers X, Y, and Z. The address data of the virtual stylus 15 is set so that it is virtually poised above an initial scan position of memory array 14. In this step a release flag is also reset. The release flag is a flag, e.g., a zero-flag flip-flop of a flag register provided in the CPU 7, indicating whether the virtual stylus 15 is in contact with interface S between areas of bits "1" and "0" of the virtual model in binary representation. Setting the release flag corresponds to a state in which the virtual stylus 15 has made contact with the interface S.

In the next step 3, ST3, the virtual model data is transferred into a three dimensional memory array 14 of the RAM from an external storage device (not shown). Either a "1" or a "0" bit is stored in each of the three-dimensional memory array cells of the RAM, which is arranged in the form of box as shown in FIG. 4(A) according to the desired configuration of the product to be produced.

In the next step 4, ST4, point $P_1$ of the virtual stylus 15 is moved at first to the initial scan position P shown in FIG. 4(A). In this step, the z axis data of the exterior and interior contours SO and SI within the RAM are changed so that the tip $P_1$ of the virtual stylus 15 is brought into contact with the initial scan positon P as follows: $P_1$ ($x_4$, $y_4$, $z_0$), $P_2$ ($x_7$, $y_4$, $-z_1$), $P_3$ ($x_4$, $y_1$, $-z_1$), $P_4$ ($x_1$, $y_4$, $-z_1$), $P_5$ ($x_4$, $y_7$, $-z_1$), $P_6$ ($x_8$, $y_4$, $-z_4$), $P_7$ ($x_4$, $y_0$, $-z_4$), $P_8$ ($x_0$, $y_4$, $-z_4$), $P_9$ ($x_4$, $y_8$, $-z_4$), $P_{10}$ ($x_4$, $y_4$, $-z_1$), $P_{11}$ ($x_7$, $y_4$, $-z_4$), $P_{12}$ ($x_1$, $y_4$, $-z_4$), $P_{13}$ ($x_1$, $y_4$, $-z_4$), and $P_{14}$ ($x_4$, $y_7$, $-z_4$). At this time, the coordinates of at least one point of the virtual stylus 15, i.e., at least one of the exterior contour SO, $P_1$ through $P_9$ is transferred into the servo controller 11 (shown in FIG. 2) of the position device section 6 so that a tool (such as cutter) of the NC machine body will be positioned according to the initial position and so face the workpiece before the cutting operation begins. Alternatively, the reference point of the actual tool could be taken to be one of the interior points $P_{10}$-$P_{14}$.

In step 5, ST5, the bit value, i.e., bit "1" indicated by the three registers X, Y, and Z are ANDed with bit values indicated by three other registers X', Y', and Z'. In more detail, the bit value, i.e. bit "1" of the position $P_1$ as specified by the addresses in the three registers X, Y, and Z $\{(X)=x_4, (Y)=y_4, (Z)=z_0\}$ is ANDed with either bit "1" or "0" from the data of the virtual model in the three-dimensional memory array cell specified by the same coordinates which may, for example, be loaded in three other registers X', Y', and Z' $\{(X')=x_4, (Y')=y_4, (Z')=z_0\}$. Alternatively, a single set of X, Y, Z registers may be used to store the coordinates of the stylus, and the memory array may be accessed using these coordinates to determine whether the model data contains a "0" or "1" value stored therein. The logical product of the stylus, which is always taken as a "1" bit, and the model data having the same coordinates as the stylus is the equivalent of determining whether the value stored in the model data memory array 14 at the corresponding coordinates of the stylus ($P_0$-$P_{14}$) is either a "0" or "1". In either case, the result is stored in a designated A address or A register. If the logical product is "0", the value "0" is loaded into register A. If the contents of the register A is "0", the logical product processing of the other specified points $P_2$ through $P_9$ may not be needed at this stage since only the tip of the virtual stylus is used at the initial position P. However, the logical product processing of the coordinate points $P_2$ through $P_9$ whose coordinate position data are loaded sequentially into the three registers in the form of $\{(X)=x_i, (Y)=y_j, (Z)=z_k\}$ becomes necessary once the entire virtual stylus 15 has advanced into the three-dimensional array 14.

Alternately, a group of registers X, Y, Z and X', Y', Z' may be used for simultaneously taking the logical product (ANDing) of the stylus and model data wherein the number of registers in the group equals to the number of points, namely 14 X and X' registers, 14 Y and Y' registers and 14 Z and Z' registers. After all data has been read from the memory array 14, the logical product can be attained in parallel.

In step 6, ST6, the contents of register A are checked to see if it is a "0" and so determine whether the virtual stylus 15 should move further downward along the Z axis.

The case when the contents of the register A are "0", corresponding to a condition where the tip of the virtual stylus 15 has still not reached the interface S between "1" and "0" on the Z axis. Therefore, the processing routine goes to steps 7 and 8, ST7 and ST8, so that the virtual stylus 15 advances further in the Z-axis direction by a predetermined distance Zu. The predetermined distance Zu corresponds to, e.g., one-bit increment along the Z axis. This one-bit increment may correspond to a unit length, e.g., 1 mm. If the virtual stylus 15 advances along the Z-axis and does not reach a maximum limit $Z_{max}$ in step 9, ST9, the routine returns to the step 4 where the coordinates of the exterior and interior points $P_1$ through $P_{14}$ whose z-coordinates are each incremented by the predetermined distance Zu in step 8, ST8, are loaded sequentially into the three registers X, Y, and Z and the virtual model addresses within the memory array 14 corresponding to the position of one of the points $P_1$ through $P_9$ of the virtual stylus 15 are sequentially loaded into the other three registers X', Y', and Z'.

In the case when the contents of the register A that the logical product in the step 5, ST5, was "1" the routine goes to step 10, ST10, since the virtual stylus 15 cannot advance any further in the Z-direction.

In the step 7, ST7, after the step 6 in which the contents of the register A are judged to be "0", the routine checks to see if the release flag is set. The routine goes to the step 8, ST8, immediately since the release flag is reset except when the virtual stylus 15 has excessively penetrated the virtual surface S between "1" and "0" within the memory array 14 as will be explained in more detail below. When the release flag is determined to be set in step 7, ST7, the routine goes to step 12, ST12. The reason for checking the state of release flag will be explained later.

In the step 8, ST8, the exterior contour SO points $P_1$ through $P_9$ to which the predetermined distance Zu is added is loaded into the z-axis register Z so that the virtual stylus 15 advances accordingly in the Z-direction by the predetermined distance Zu. If the updated Z-value is not equal to the movement limit $Z_{max}$ along the Z-axis direction in the step 9, ST9, the routine returns to the step 4, ST4, where the virtual stylus 15 is moved only along the Z-axis direction by the predetermined distance Zu. Since the X and Y coordinates are not changed, the loop formed by the steps 4 through 9 is repeated until the contents of register A indicates at least one bit "1" indicating that advancement of the virtual stylus in the Z direction has succeeded in making contact with the virtual model surface S.

It will be noted that if the contents of register A does not indicate at least one bit "1" before the virtual stylus 15 is moved to the limit value $Z_{max}$ of the Z-axis direction, the routine is released from the loop described above and then the co-ordinate positional addresses within the three registers X, Y, and Z are transferred to the movement position control device section 6 and the program proceeds to step 16, ST16.

On the other hand, if in step 6, ST6, the contents of the register A indicate at least one "1" bit, the routine goes to a step 10, ST10, where the bit values, i.e., either bit "1" or "0" of the model data MDL stored within the memory array 14 at coordinates in registers X', Y', Z' equal to the coordinates in registers X, Y, Z and bit "1" of the interior contour SI, i.e., $P_{10}$ through $P_{14}$ (whose coordinates are loaded sequentially into the three registers X, Y, and Z) are ANDed and the logical AND result is stored in another register B, i.e., "0" if the result indicates all bits "0's" and "1" if the results include at least one bit "1". Thereafter, in a step 11, ST11, a check is made to see if the contents of register B is "0" or "1" in order to determine whether there has been an excessive advance of the virtual stylus 15 in the Z-direction.

In other words, if the contents of register B are "0", only points $P_1$ through $P_9$ of the exterior contour of the virtual stylus 15 are in contact with the boundary surface S between "1" and "0" within the memory array 14, and the virtual stylus 15 does not need to advance any more into the area of the bit "1" data (the model MDL area), so that the routine goes to the steps 12 and 13, ST12 and ST13.

Conversely, if the contents of register B indicate "1", the routine goes to a step 14, ST14, since the virtual stylus 15 has excessively penetrated the area of the bit "1" data (model MDL area), and the virtual stylus 15 is moved upward out of the area of the bit "1" data (model MDL area) by the predetermined amount Zu in the step 14, ST14.

In the step 12, ST12, after determining that the contents of the register B is "0" in step 11, the release flag is reset. However, the step 12, ST12, is ordinarily redundant since the release flag is set in a step 15, ST15, only when the virtual stylus 15 has penetrated excessively into the model MDL area. In the step 13, ST13, at least one point $P_1$ through $P_9$ of the exterior contour position data SO of the virtual stylus 15 whose coordinates are loaded sequentially in the three registers X, Y, and Z are transferred into the movement position control device section 6 (shown in FIG. 2), and then the routine goes to the step 16, ST16.

In the step 14, ST14, subsequent to the step 11 ST11, the data in the Z-axis register Z is decremented by the predetermined distance Zu.

After the release flag is set in step 15, ST15, the routine returns to the step 4, ST4, so that the virtual stylus 15 is shifted away from the interface S only along the Z-axis direction by the predetermined amount Zu.

After the step 4, ST4, the routine goes to steps 5 and 6, ST5 and ST6. The reason why the routine goes to the steps 14 and 15 as described above is to handle the case in which the virtual stylus 15 does not reach the interface S after the virtual stylus 15 has advanced toward the interface S a distance equal to n times the predetermined distance Zu (n×Zu) and the virtual stylus 15 penetrates the interface S so that even the interior contour SI penetrates the interface S when the virtual stylus 15 advances toward the interface S a distance equal to n+1 times the predetermind distance Zu {(n+1)×Zu}. Therefore, when the virtual stylus 15 is withdrawn from the interface S by the predetermined amount of Zu in the step 4, ST4, the contents of the register A would otherwise be "0," so that the routine advances toward the step 7, ST7, not toward the step 10, ST10, shown in FIG. 5(B). In this case, however, execution advances from the step 7, ST7, to the step 12, ST12, not toward the step 8, ST8, since the release flag is set in step 15, ST15 so that the virtual stylus 15 is not advanced by the predetermined distance Zu.

After the release flag is reset in the step 12, ST12, the exterior contour position data SO of the virtual stylus 15 whose coordinates $P_1$ through $P_9$ are indicated by the three registers X, Y, and Z is thus transferred into the movement position device section 6 in the step 13 and the routine advances the step 16, ST16.

In the above-described case of processing routine, although the virtual stylus 15 does not exactly conform to the interface S, between "1" and "0" within the memory space 14 because of the step-wise movement of the virtual stylus 15 by the predetermined distance Zu, positional errors in detecting whether the virtual stylus 15 contacts the interface S are negligible if the predetermined distance Zu is sufficiently small, i.e., if the number of bits for a unit length is made large.

Next, the scanning of the virtual stylus 15 within the three-dimensional memory array 14 along the x-axis direction described hereinbefore is carried out by performing steps 16, 17, 18A, and 18B (ST16, ST17, ST18A, and ST18B) to the steps 4 through 15 by which the virtual stylus 15 moves in the x-axis direction by a predetermined distance Xu until it reaches a maximum movement limit $X_{max}$. Upon completion of the above-described extended loop, the scanning is carried out along the dotted line shown in FIG. 4(A) in a zigzag fashion until the virtual stylus 15 reaches at the maximum movement limit $Y_{max}$ of the y-axis direction. This is achieved by performing steps 18, 19, and 20 (ST19, and ST20) respectively to the routine as shown in FIG. 5(C). The step 18, ST18 is provided for reversing the scanning direction along the x-axis by decrementing the x-coordinates of each of the exterior and interior contour points $P_1$ through $P_{14}$ by the predetermined distance Xu each time the virtual stylus 15 moves in the negative direction of the x-axis from the maximum limit $X_{max}$.

It should be noted that in the step 18A, ST18A, the routine checks to see if the virtual stylus 15 has reached the minimum limit $X_{min}$ after moving in the negative x-direction. When virtual stylus 15 reaches at the minimum limit $X_{min}$, the x-direction increment is returned to its positive value in the step 18B, ST18B, so that the virtual stylus 15 again moves in the positive x-direction.

In this way, the scanning of the virtual stylus 15 along the interface S between "1" and "0" within the three-dimensional memory array 14 ends when the y-coordinate reaches the maximum value $Y_{max}$ at step 20, ST20. According to the above routine, the servo controller 11 within the movement control device section 6 shown in FIG. 2 moves the tool with reference to the rectangular coordinates of at least one point $P_1$ through $P_9$ of the virtual stylus 15 transferred from the microcomputer section 5 via the output unit 10 to fabricate accurately the product. After the cutting operation, the rectangular coordinates are re-initialized to return the tool to the original position P of the three-dimensional coordinate system in steps ST21 through ST24 of FIG. 5(C).

In the preferred embodiment described above, positional data corresponding to the configuration of the virtual model in the lower "1" bit area of the three-dimensional memory array 14 shown in FIG. 3 is used to guide fabrication of the product. If the scanning direction along the z-axis direction of the virtual stylus 15 is reversed so that the virtual stylus 15 moves from the bottom of the memory array 14 and the resulting criteria governing the result stored in the two registers A and B in the steps ST6 and ST11 is also wholly reversed with respect to binary "0" and "1" values, a second group of positional data corresponding to the upper bit "0" area of the virtual model space 14 shown in FIG. 3 can be generated from the basic data already stored in order to fabricate a product having complementary or female contours by upwardly scanning the virtual stylus 15 upwards along the interface S.

In the above-described embodiment the present invention is described as applied to a three-dimensional NC machine tool. The same method can be applied equally as well to an automatically mobile machine such as robot having a movement control device which controls the movement position of, e.g., arm on a basis of a positional data of the virtual model.

As described above, since the virtual image of a model to be scanned is previously constructed as a distribution of bits "1" and "0" within a specified three-dimensional memory array 14 so that the positional data for a tool facing the workpiece can be obtained by means of a mere logic operation, i.e., AND (logical product) in a program, there is no need for all the positional data to be recorded on numerous NC tapes as found in a conventional NC machine tool, and there is no problem of complicated calculations even in the case of complicated free curved surface, provided that the memory capacity is large. There is no aging problem since the model is not physical such as profiled metal mold. Reduction of the amount of data required is also possible since only the positional of the interface S between the volumes occupied by "1's" and "0's" is required.

Furthermore, it is also possible that a large computer which constructs the virtual model and stylus within a three-dimensional memory array may also hold the coordinates of the virtual stylus instead of the microcomputer and feed them into the microcomputer upon command.

It will be fully understood by those skilled in the art that the foregoing description is in terms of preferred embodiments of the present invention wherein various changes and modifications may be made without departing from the spirit and scope of the present invention, which is to be defined by the appended claims.

What is claimed is:

1. A method of producing a product having a surface of a desired configuration utilizing a machine programmed to move a tool and a workpiece relative to one another comprising the steps of:
    (a) establishing a memory array having addresses corresponding to the three coordinates of points in three-dimensional space;
    (b) defining a binary system having a first value and a second value;
    (c) placing said workpiece and said tool in relative starting positions;
    (d) storing a binary representation of said surface in an initial position with respect to said tool in said memory array by:
        (i) setting data stored at addresses corresponding to said three coordinates of points on or below said surface equal to said first value, and
        (ii) setting data stored at addresses corresponding to said three coordinates of points above said surface equal to said second value;
    (e) storing a binary representation of the exterior surface of said tool in said initial position by setting data at addresses corresponding to said three coordinates of points on said exterior surface of said tool equal to said first value;
    (f) changing the addresses of said data at addresses corresponding to said exterior surface of said tool in a manner simulating movement of said tool toward said surface in a direction corresponding to one of said three coordinates;
    (g) generating an indication when said binary representation of said surface and said binary representation of said tool just coincide;
    (h) changing addresses of said data at addresses corresponding to said exterior surface of said tool in a manner simulating movement of said tool in a predetermined pattern over the other two of said three coordinates, while changing the addresses of said data at addresses corresponding to said exterior surface of said tool in a manner simulating movement of said tool along said first direction so that said binary representation of said surface and said binary representation of said exterior surface of said tool continue to just coincide; and
    (i) moving said tool relative to said workpiece in coordination with said changing addresses of said data at addresses corresponding to coordinates of said surface and said exterior surface of said tool.

2. A method as claimed in claim 1 wherein said three coordinates are rectangular coordinates.

3. A method as claimed in claim 1 in which said movement is stepwise movement.

4. A method as claimed in claim 1 wherein step (e) further comprises storing a binary representation of the interior surface of said tool, said interior surface wholly within and essentially conforming to said outer surface; and wherein step (h) further comprises the step of determining when the binary representation of said interior surface of said tool coincides with the binary representation of said surface in order to determine when a condition corresponding to excessive penetration of said surface by said tool has occurred.

5. A method as claimed in claim 1 in which said machine is a numerically controlled (NC) machine.

6. A method as claimed in claim 1 wherein said indication in step (g) is generated by taking the logical product of said data stored at addresses corresponding to said binary representation of said surface and said data stored at addresses corresponding to said binary representation of said tool.

7. A method of producing a product from a workpiece utilizing a numerically controlled machine programmed to controllably move a tool and the workpiece relative to one another to produce the product having a predetermined desired configuration, comprising the steps of:
 (a) storing a binary representation of the surface of the product to be produced in selectably accessible memory locations of the numerically controlled machine;
 (b) storing a binary representation of the outer surface of the tool in said memory of said machine;
 (c) storing a binary representation of an inner surface wholly within and essentially conforming with said outer surface in said memory;
 said binary representations all being configured in terms of a single spatial coordinate system;
 (d) changing the coordinates of the binary representations of said outer and inner surfaces by a predetermined amount so as to simulate step-wise movement of the tool toward the surface of the product along one axis of said coordinate system;
 (e) changing the coordinates of the binary representations of the outer and inner surface along the other axis or axes of the coordinate system when the coordinates of at least one point of the binary reperesentation of the outer surface coincide with those of a point of the binary representation of said product surface;
 (f) changing the coordinates of the binary representations of the outer and inner surfaces by the inverse of said predetermined amount along the first-mentioned axis of the coordinate system so as to simulate movement of the tool away from the product surface when the coordinates of at least one point of the binary representation of the inner surface coincide with those of a point of the binary representation of the product surface; and
 (g) moving the tool relative to the workpiece in accordance with the changes in the coordinates of the binary representation of the outer surface.

* * * * *